Nov. 20, 1951    E. A. NEU, JR    2,575,677
PUMP DISCHARGE VALVE

Filed Nov. 3, 1950    2 SHEETS—SHEET 1

INVENTOR
EDWARD A. NEU, JR.

BY *William R. Wright Jr.*
AGENT

Nov. 20, 1951  E. A. NEU, JR  2,575,677
PUMP DISCHARGE VALVE

Filed Nov. 3, 1950  2 SHEETS—SHEET 2

INVENTOR
EDWARD A. NEU, JR.

BY *William P. Wright, Jr.*
AGENT

Patented Nov. 20, 1951

2,575,677

UNITED STATES PATENT OFFICE 2,575,677

PUMP DISCHARGE VALVE

Edward A. Neu, Jr., Rockaway, N. J., assignor to Reaction Motors, Inc., Rockaway, N. J., a corporation of New Jersey Application November 3, 1950, Serial No. 193,767

4 Claims. (Cl. 103—40)

The present invention relates to a pump discharge valve which will open automatically when the pressure differential between the pump inlet and the pump discharge reaches a predetermined amount, but which can be closed fully, quickly and positively at any desired time by remote control. It relates also to the system of controls used with the valve as a part thereof to cause it to perform in the desired manner.

In fluid supply systems where pumps are included, and where the pressure of the fluid supplied to the pumps may vary considerably, it is frequently desirable to prevent flow of the fluid from the pump discharge until the pumps are definitely in operation. Since the pump inlet pressure may vary considerably, a valve set to open at a specific pressure value might open even if the pumps were not in operation. The present invention, however, provides a valve which will open only when the difference in pressure between the pump inlet and discharge, the discharge being the greater, reaches an amount sufficient to open the valve as determined by the physical characteristics of the valve. Thus it is assured that the pumps are properly in operation at the time of opening of the valve.

The present invention is useful in many applications where pumps are utilized, but is of outstanding usefulness as a valving device for permitting or preventing the flow of liquid propellants from pumps to the combustion chamber of a rocket type of reaction motor. In such motors, the liquid propellants comprise a fuel and an oxidizer such as alcohol and liquid oxygen. It will be evident to those skilled in the art that the flow of such propellants must be controlled in a precise and exacting manner lest premature flow allow the fluids to accumulate in the combustion chamber and thereby cause a dangerous condition which might well result in an explosion or, at the least, difficulty in starting of the motor. It will also be evident that a constant flow of propellants to the combustion chamber must be provided by the pumps if the reaction motor is to run properly. Accordingly, the present invention provides a propellant valve means which will allow propellants to flow only when the pumps associated with it are in proper operation.

The shut off characteristics of a valve used for this purpose are also of great importance for it is essential that the propellant flow be stopped quickly and positively in the event of abnormal conditions downstream of the valve. An arrangement is herein provided whereby such closure of the valve is accomplished by operation of a remote control. Further, in the event of fire or excessive back pressure in the propellant line downstream of the propellant valve, a means is herein provided to automatically close the valve to thus prevent flame or hot gases from progressing backward through the valve to the pumps and supply sources.

It is, therefore, an object of the present invention to provide a pump discharge valve which will open automatically to allow fluid to flow when the pump discharge pressure becomes greater than the pump inlet pressure by a predetermined amount, thus providing a valve which will open only at this differential in pressure regardless of the magnitude of the individual pressures involved.

It is another object of the present invention to provide such a valve with a means whereby the valve will automatically and immediately close itself to shut off the flow of fluid in the event of excessive pressure caused by fire, or otherwise, in the fluid line downstream of the valve.

It is another object to provide such a valve which when once closed will remain so despite the extent of the pressure in its inlet, but which can, at the will of an operator, be quickly reset for automatic opening at a predetermined amount of differential pressure by remote operation of a second valve.

It is a principal object of the present invention to provide a simple, lightweight and efficient valve and control system wherein the aforementioned objects are realized in one combination.

Other objects and advantages of the present invention will become apparent from the general and detailed description which follows.

As previously pointed out in this specification, this valve means is useful in many fluid control systems where pumps are involved, but is of particularly importance when applied as a propellant flow valve in a rocket motor control system. Accordingly, the valve is embodied herein in that capacity. It is not intended, however, to limit the present invention to that specific application.

In the operation of a reaction motor of the rocket type where propellants, i. e. fuel and oxidizer, are fed to the combustion chamber of the motor to be consumed therein, it becomes essential to control the flow of the propellants in such a manner that they will be supplied to the combustion chamber of the motor at the proper pressure and in a continuous flow. It is also important that some very effective means be employed to insure that flow of the propellants does not occur prematurely. The present invention solves these problems by providing a normally closed valve having a piston held against the valve seat by a compression spring calibrated to allow the valve to open at a predetermined pressure, this pressure being the differential between that at the pump discharge and that at the pump inlet. In this way, the valve opens only when the pumps are running, for in no other way will the pressure at the pump discharge be made substantially greater than that at its inlet. The present invention also solves the problem of quick and positive shut off of the propellant flow by providing a means of equalizing the pressure on both sides of the valve piston to allow the compression spring to move the piston to the closed position. This is described in detail later in this specification.

It is also important in the operation of such motors that a means be provided to prevent reverse flow through the valve due to excessive pressure in the outlet or conduit downstream of the valve brought about by fire in the conduit. It is evident that the valve must be instantly closed to prevent this fire from spreading backward through the valve to the propellant pumps and supply tanks. This has been accomplished by the provision of a shuttle valve system which automatically allows fluid pressure from the propellant valve outlet to exert itself upon the end of the piston opposite to the inlet to add its force to that of the spring to close the propellant valve. This arrangement is also described in detail in the description which follows.

Figure 1:
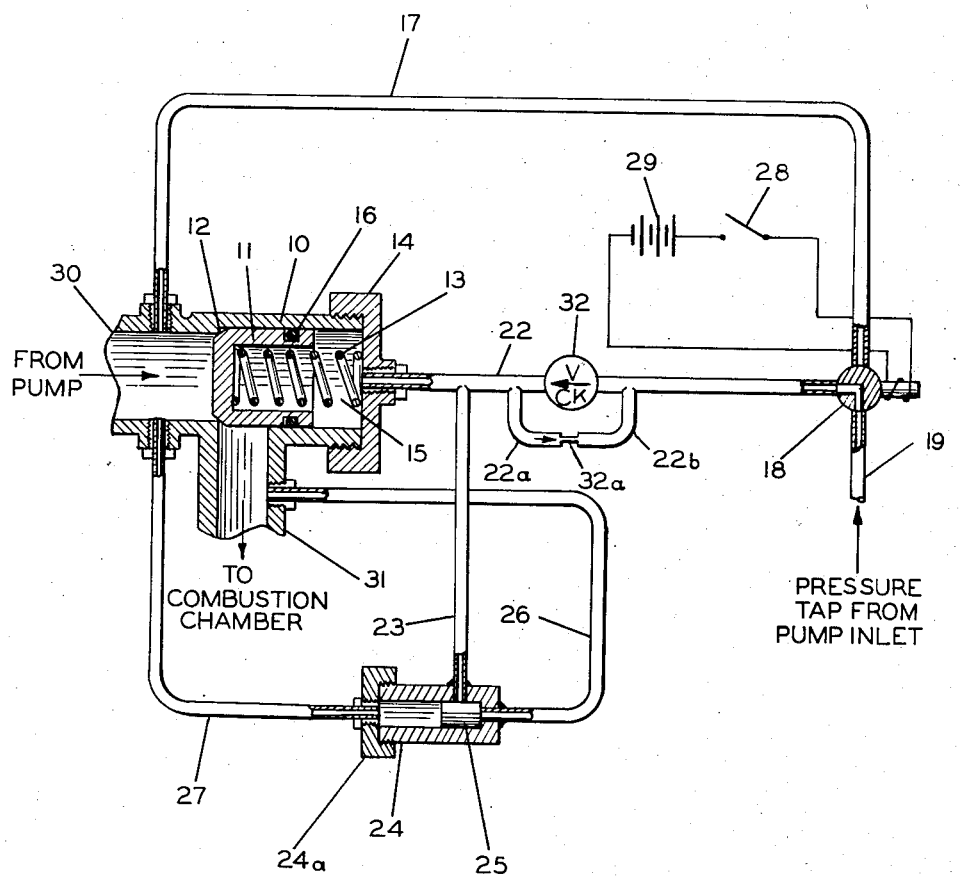
Figure 1 is a cross sectional view of the valve and its control system.

Reference to Figure 1 shows a valve comprising, principally, a substantially annular valve body 10 having an inlet 30, an outlet 31, a cylindrical chamber 15, a cylindrical piston 11 slidable within chamber 15 and having a resilient annular seal 16 set in its periphery in sealing relationship to the wall of chamber 15, a seat 12 for piston 11, a threaded cap 14 at the outer end of chamber 15 to close it to form a chamber or dome space, and a helical compression spring 13 in chamber 15 interposed between piston 11 and threaded cap 14 to exert a force on piston 11 to hold it in its normally closed position against its seat 12 in the manner shown. A conduit or tube 17 is connected into and communicates with inlet 30 and, at its other end, connects to and communicates with two-way remotely-controlled electrical selector valve 18. From valve 18, another fluid conduit 22 is connected to cap 14 through which it communicates with dome or chamber 15. A check valve 32 is located in conduit 22 and is arranged to allow free flow in the direction of the dome 15. A bypass, which includes conduit 22a and 22b and a flow restrictor 32a connected thereto, is provided for check valve 32 to allow a very small amount of flow to take place in the direction opposite to that through the check valve for purposes to be described later in this specification. Conduit 23 connects and communicates with conduit 22 in the manner shown and is connected at its other end to communicate with the interior of shuttle valve body 24. This shuttle valve comprises a valve body 24 which has a longitudinal cylindrical bore through it, one end of which is closed as an integral part of the body and the other end of which is closed by a threaded cap 24a. Within the bore is a slidable free piston 25 so fitted as to prevent any substantial leakage between it and the valve body. Conduit 27 is connected thru cap 24a to the interior of shuttle valve 24 and communicates with inlet 30 of the main valve in the manner shown, while conduit 26 connects the opposite end of the interior of shuttle valve 24 to outlet 31 of the main valve in the manner shown. Free piston 25 is so proportioned, and the entrance of tube 23 to shuttle valve 24 is so located, that when piston 25 is in the position shown in Figure 1 both conduits 23 and 26 are blocked off so that fluid under pressure cannot be transmitted to them through the valve body. However, when piston 25 is moved to the left in Figure 1, the openings of both conduits 23 and 26 are uncovered to allow communication from one to the other.

Figure 2:
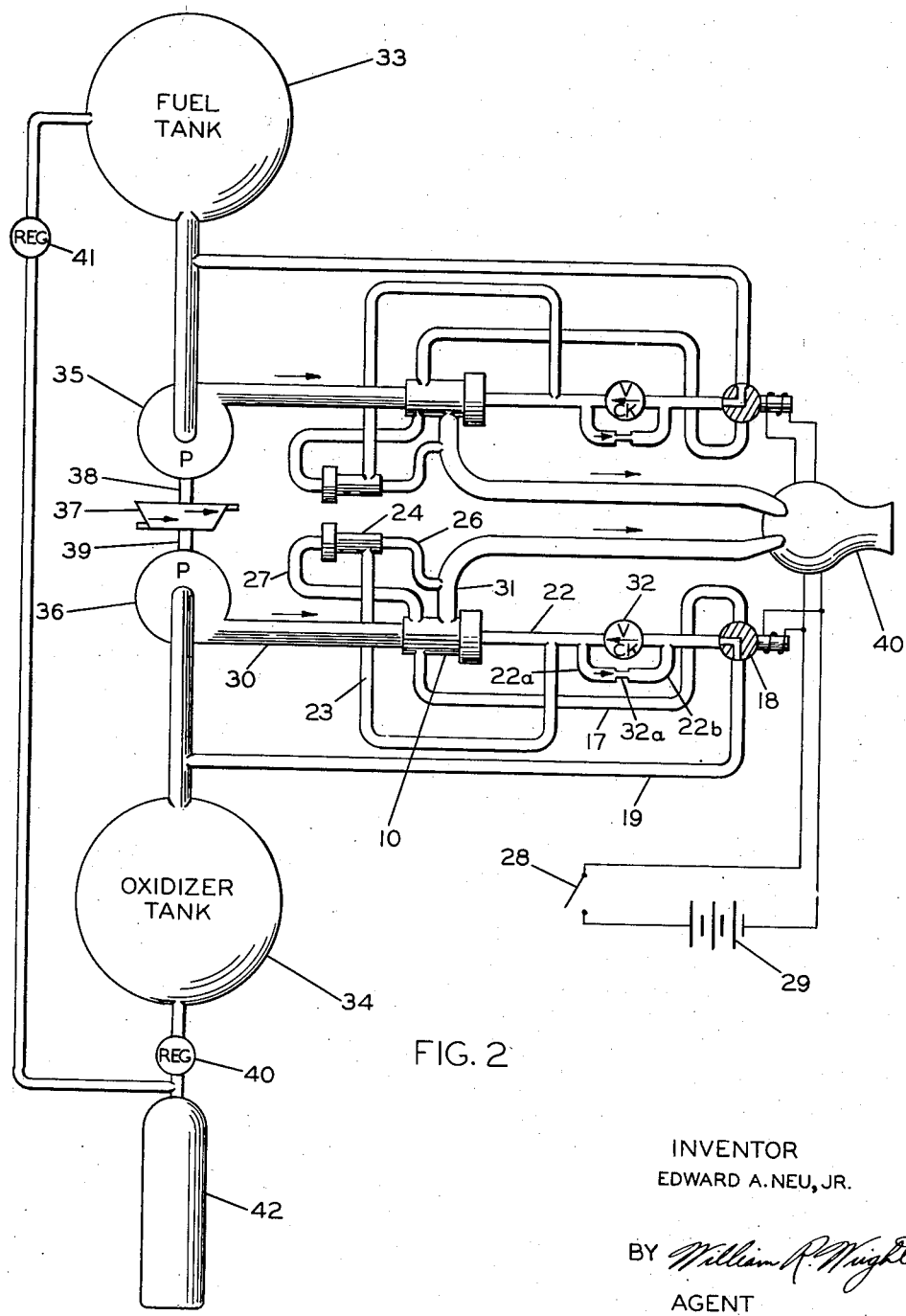
Figure 2 is a view of a reaction motor propellant valve control system utilizing the valve control system to control two propellants.

In Figure 2 is shown a rocket motor control system utilizing the valve shown in Figure 1. Here two identical valve control systems are used, each operating a main propellant valve to control the flow of two propellants, one propellant being a fuel and the other an oxidizer such as liquid oxygen. Fuel is supplied from tank 33 to pump 35, and oxidizer is supplied from tank 34 to pump 36. The fluid propellant is made to flow to the pumps by pressurization of the tanks through introduction to them of nitrogen, or some other suitable gas, from regulating means 40 and 41 fed by a pressure source 42. Separate regulators are shown here in order that the propellants may be individually pressurized to the extent desired for that particular fuel or oxidizer. Both of the pumps are of the centrifugal type, and are driven by shafts 38 and 39 from a gas driven turbine, the pressurized gas for which is provided from some suitable source. From each of the pumps, a fluid conduit leads directly to each of the propellant valves 10 which are each connected into a system identical to that shown in Figure 1 except for the electrical circuit, which is connected in a manner to operate both selector valves simultaneously as shown in Figure 2 and as described in the description of operation to follow in this specification.

It will be seen from Figure 2 that as pumps 35 and 36 are started in action by rotation of their respective shafts 38 and 39 by operation of turbine 37, the fluid pressure of the propellants in each of their respective fluid discharge conduits will increase over that pressure in each of their respective inlets. This fluid pressure, for one of the propellants, oxidizer for instance, will be transmitted to valve inlet 30 in Figure 1 where it exerts itself upon piston 11 and is also transmitted through conduit 17 only to valve 18 which is in a closed position. Valve 18 is instead so positioned as to connect conduits 19 and 22 thus allowing fluid pressure to be transmitted from the oxidizer pump inlet to the dome space 15. With the pumps in operation, the pump discharge pressure will become considerably greater than that at its inlet, and since these two pressures are transmitted to opposite ends of piston 11, a sufficient differential in these pressures on piston 11 will accordingly increase the force on spring 13 until the spring is compressed and piston 11 lifts from its seat. This will occur at a specific differential pressure dependent upon the calibration of the spring, and oxidizer will flow through conduit 31 to the combustion chamber of reaction motor 40. The fuel propellant valve system will function in an identical manner to supply fuel to the reaction motor.

During operation of the reaction motor, as stated previously herein, there is a possibility, due to some malfunctioning or structural failure in the motor, of fire progressing backward from the motor through the propellant valve to the main supply tanks. To eliminate the chance of passage of flame or hot gases backward through the propellant valve, shuttle valve 24 is utilized. Normally free piston 25 is held in the position shown in Figure 1 by the pressurized fluid carried to it from inlet 30. In the event of excessive heat or flame in the propellant line downstream of the propellant valve, the pressure in that line will increase and become greater than that at inlet 30 due to the normal pressure drop through the propellant valve, and conduit 26 will transmit this pressure to piston 25 causing it to move all the way to the left in Figure 1. This motion allows pressure to be transmitted through conduit 23 to dome 15 where it acts upon poppet 11 and combines with the force of spring 13 to positively move poppet 11 to the closed position to shut off the propellant flow and to prevent further flame or hot gas travel. Check valve 32 is provided in conduit 22 to prevent any substantial amount of fluid flow toward valve 18 from conduit 23, but bypass restrictor orifice 32a allows a very small amount of flow to take place in that direction. The flow through restrictor 32a is so little as to have no appreciable effect on the closing movement of piston 11 and yet allows the pressure within dome space 15 to be gradually relieved so that the valve will restore itself to a condition where it can again be operated as previously described. After the propellant valve is closed by the action of shuttle valve 24, the propellant pumps are shut down manually and the system is thus restored to its original inoperative condition.

During normal operation of the reaction motor with the propellant valve open, if it be desired to shut off the flow of propellants as a part of routine operation, electromagnetic selector valve 18 is operated by closure of remotely located switch 28 which completes an electrical circuit from battery 29 to the electromagnetic operating coils of selector valves 18 and 18a thus causing both selector valves to operate simultaneously to admit pressure from the inlet side of the propellant piston 11 to the opposite side of piston 11 to equalize the fluid pressures thereon and to allow its spring to move it to the closed position to shut off the flow of propellants.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A propellant supply system for a reaction motor comprising a supply reservoir for each propellant, a pump for each propellant, means for connecting each reservoir to the inlet of its respective pump, means for operating said pumps, conduit means between the outlet of each pump and a reaction motor, a normally closed spring-loaded main piston valve in each such conduit between the pump outlets and the reaction motor, said main piston valve having a dome space at that end of the piston which is opposite to the inlet of the valve, a two-position selector valve connected by a conduit to said dome space, a conduit connecting said selector valve to the inlet of its associated pump, means for operating said selector valve to allow fluid pressure communication between said dome space and the inlet of the associated pump during starting and operation of the reaction motor, a conduit connecting said selector valve to the inlet of the said main piston valve, and means for operating said selector valve to allow fluid pressure communication between said dome space and the inlet of the main piston valve to equalize the fluid pressures on the poppet of said valve thereby allowing the said spring loaded main piston valve to close to shut off the flow of that propellant to the reaction motor.

2. The invention set forth in claim 1 with electrical means for operating the selector valves simultaneously.

3. The invention set forth in claim 1 with an automatic shuttle valve operable upon increase of fluid pressure at the main valve outlet over that existing at the main valve inlet to allow the said outlet fluid pressure to be transmitted to the dome space of the said main valve, and a check valve between said selector valve and said dome space.

4. The invention set forth in claim 1 with automatic means for preventing reverse flow through the main valve, said means comprising a shuttle valve body having an enclosed chamber within it, a first conduit connecting one end of said chamber with the main valve inlet, a second conduit connecting the other end of said chamber with the outlet of said main valve, a third conduit connecting the dome space of the main valve with a port in the side of the said chamber adjacent to the shuttle valve entrance of the said conduit, and a free piston slidable within the said chamber in sealing relationship thereto and in a direction dependent upon the extent of the pressures exerted upon it from said first and second conduits, and said free piston so proportioned as to block communication between the conduits when in one position and when in a second position to allow communication between said second and third conduits, said second position being that assumed by the said free piston in the event of a greater pressure at the main valve outlet than at the main valve inlet, and a check valve between said selector valve and said dome space.

EDWARD A. NEU, Jr.

REFERENCES CITED

The following references are of record in the file of this patent:

UNITED STATES PATENTS

| Number | Name | Date |
|---|---|---|
| 2,404,936 | Wills | July 30, 1946 |
| 2,500,627 | Chinn | Mar. 14, 1950 |

FOREIGN PATENTS

| Number | Country | Date |
|---|---|---|
| 823,859 | France | 1937 |